US012671080B2

(12) United States Patent
Hong et al.

(10) Patent No.: US 12,671,080 B2
(45) Date of Patent: Jun. 30, 2026

(54) LITHIUM-ION BATTERY ANODE

(71) Applicants: Tsinghua University, Beijing (CN);
**HON HAI PRECISION INDUSTRY
CO., LTD.**, New Taipei (TW)

(72) Inventors: Zi-Xin Hong, Beijing (CN); **Zhen-Han
Fang, Beijing (CN); Jia-Ping Wang**,
Beijing (CN); Shou-Shan Fan, Beijing
(CN)

(73) Assignees: Tsinghua University, Beijing (CN);
**HON HAI PRECISION INDUSTRY
CO., LTD.**, New Taipei (TW)

( * ) Notice: Subject to any disclaimer, the term of this
patent is extended or adjusted under 35
U.S.C. 154(b) by 584 days.

(21) Appl. No.: 17/972,752

(22) Filed: Oct. 25, 2022

(65) Prior Publication Data

US 2023/0402582 A1      Dec. 14, 2023

(30) Foreign Application Priority Data

Jun. 10, 2022      (CN) ......................... 202210655988.X

(51) Int. Cl.
| | |
|---|---|
| *H01M 4/36* | (2006.01) |
| *C01B 32/158* | (2017.01) |
| *H01M 4/133* | (2010.01) |
| *H01M 4/134* | (2010.01) |
| *H01M 4/38* | (2006.01) |
| *H01M 4/587* | (2010.01) |
| *H01M 4/02* | (2006.01) |

(52) U.S. Cl.
CPC ........... *H01M 4/364* (2013.01); *C01B 32/158*
(2017.08); *H01M 4/133* (2013.01); *H01M
4/134* (2013.01); *H01M 4/366* (2013.01);
*H01M 4/386* (2013.01); *H01M 4/587*
(2013.01); *C01B 2202/08* (2013.01); *C01B
2202/22* (2013.01); *C01B 2202/24* (2013.01);
*H01M 2004/021* (2013.01); *H01M 2004/027*
(2013.01)

(58) Field of Classification Search
CPC ...... H01M 4/364; H01M 4/133; H01M 4/134;
H01M 4/366; H01M 4/386; H01M 4/587;
H01M 2004/021; H01M 2004/027; H01M
4/625; H01M 10/0525; C01B 32/158;
C01B 2202/08; C01B 2202/22; C01B
2202/24; Y02E 60/10
See application file for complete search history.

(56) References Cited

U.S. PATENT DOCUMENTS

| | | |
|---|---|---|
| 10,879,525 B2 | 12/2020 | Yu et al. |
| 2014/0013588 A1 | 1/2014 | Wang et al. |
| 2014/0045065 A1 | 2/2014 | Bao et al. |
| 2018/0309115 A1* | 10/2018 | Zhu ........................ H01M 4/139 |
| 2018/0351195 A1* | 12/2018 | Kong .................. H01M 4/5815 |
| 2020/0194787 A1* | 6/2020 | Lee ...................... H01M 4/1393 |
| 2020/0350566 A1* | 11/2020 | Ha ......................... H01M 50/46 |

FOREIGN PATENT DOCUMENTS

| | | |
|---|---|---|
| CN | 108963227 A | 12/2018 |
| CN | 112201788 | 1/2021 |
| CN | 113241439 | 8/2021 |
| TW | 201403916 A | 1/2014 |
| TW | 202002366 A | 1/2020 |
| TW | 202103359 A | 1/2021 |
| WO | 2022070895 | 4/2022 |

* cited by examiner

*Primary Examiner* — Muhammad S Siddiquee
(74) *Attorney, Agent, or Firm* — ScienBiziP, P.C.

(57) ABSTRACT

A lithium-ion battery anode is provided. The lithium-ion
battery anode comprises a carbon nanotube three-dimen-
sional network structure formed by a plurality of carbon
nanotubes intertwined with each other. A plurality of nano-
silicon particles coated with amorphous carbon, dispersed in
the carbon nanotube three-dimensional network structure,
and adhered to surfaces of the plurality of carbon nanotubes.
The amorphous carbon is obtained by calcining a positively
charged carbonizable polymer. And a carbon nanotube func-
tional layer located on two opposite surfaces of the carbon
nanotube three-dimensional network structure, to make the
carbon nanotube three-dimensional network structure
located between two carbon nanotube functional layers. The
carbon nanotube functional layer comprises at least two
super-aligned carbon nanotube films stacked and crossed
with each other.

15 Claims, 15 Drawing Sheets

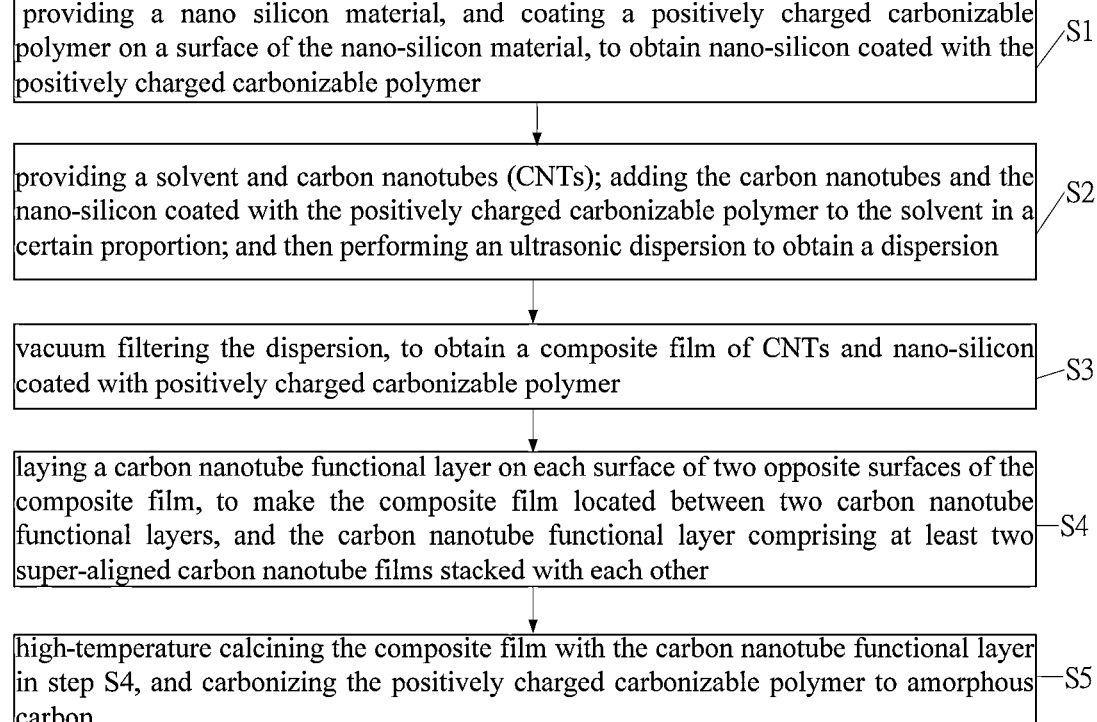

providing a nano silicon material, and coating a positively charged carbonizable polymer on a surface of the nano-silicon material, to obtain nano-silicon coated with the positively charged carbonizable polymer /S1 providing a solvent and carbon nanotubes (CNTs); adding the carbon nanotubes and the nano-silicon coated with the positively charged carbonizable polymer to the solvent in a certain proportion; and then performing an ultrasonic dispersion to obtain a dispersion /S2 vacuum filtering the dispersion, to obtain a composite film of CNTs and nano-silicon coated with positively charged carbonizable polymer —S3 laying a carbon nanotube functional layer on each surface of two opposite surfaces of the composite film, to make the composite film located between two carbon nanotube functional layers, and the carbon nanotube functional layer comprising at least two super-aligned carbon nanotube films stacked with each other —S4 high-temperature calcining the composite film with the carbon nanotube functional layer in step S4, and carbonizing the positively charged carbonizable polymer to amorphous carbon —S5

FIG. 1

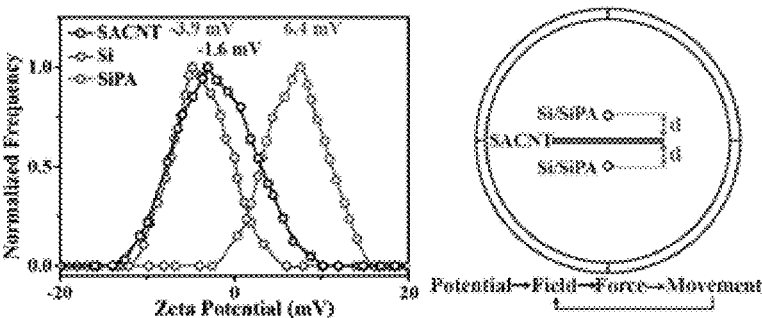
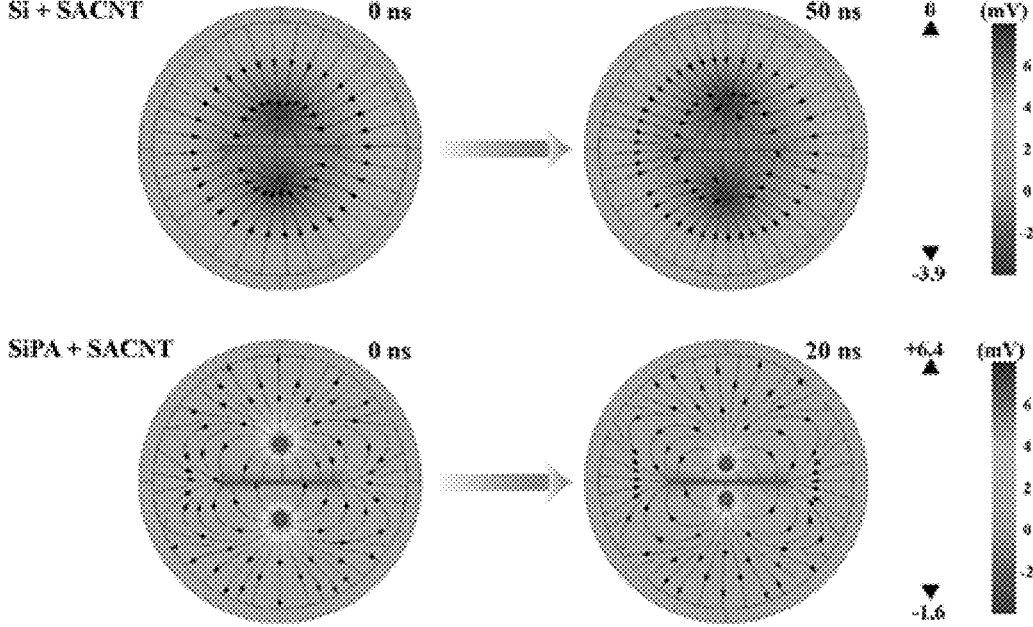
FIG. 2

LITHIUM-ION BATTERY ANODE

CROSS-REFERENCE TO RELATED APPLICATIONS

This application claims all benefits accruing under 35 U.S.C. § 119 from China Patent Application No. 202210655988.X, filed on Jun. 10, 2022, in the China Intellectual Property Office, the contents of which are hereby incorporated by reference. The application is also related to copending applications No. 17/973,631, entitled, "METHOD OF MAKING LITHIUM-ION BATTERY ANODE", filed on Oct. 26, 2022.

FIELD

The present disclosure relates to a lithium-ion battery field, especially relates to a lithium-ion battery anode comprising a composite of nano-silicon and carbon nanotubes.

BACKGROUND

Silicon (Si) has extremely high theoretical specific capacity and abundant reserves, which is an ideal anode material. With a development of electronic devices in recent years, new requirements are placed on a flexibility of the electronic devices. Therefore, a preparation of flexible silicon anodes becomes increasingly important. However, severe volume changes in Si during cycling process in lithium-ion battery easily cause an electrode to crack and detach from a current collector. Moreover, a flexibility and a conductivity of Si is poor, which limits an application of Si in lithium-ion batteries. Compared with conventional silicon materials, nano-silicon can better withstand a mechanical stress caused by volume changes and effectively avoid particle crushing. Further, a nanoscale size of nano-silicon shortens an electron transport path and enhances a conductivity of nano-silicon. However, nano-silicon is easy to agglomerate.

Carbon nanotubes (CNTs) have high aspect ratio, clean surfaces, strong van der Waals forces, and excellent electrical and mechanical properties. Macroscopic materials such as carbon nanotube films and carbon nanotube sponges prepared from CNTs exhibit excellent electrothermal and mechanical flexibility properties. Therefore, a composite of CNT and nano-silicon can obtain a flexible nano-silicon anode with excellent conductivity.

However, a Zeta potential of CNT and a Zeta potential of nano-silicon are both negative, according to electrostatic interactions, CNTs and nano-silicon repel each other. A uniform composite of CNT and nano-silicon is difficult to be achieved, and thus a uniform lithium-ion battery anode made from the composite of CNT and nano-silicon is difficult to be obtained. In addition, conventional anodes have a problem that active materials are easy to shed from electrode surfaces, which leads to a deterioration of the electrochemical performance of the lithium-ion battery.

BRIEF DESCRIPTION OF THE DRAWINGS

Implementations of the present technology will now be described, by way of example only, with reference to the attached figures, wherein:

FIG. 1 is a flow diagram of a method of making lithium-ion battery anode of one embodiment.

FIG. 2 is a simulation diagram of dispersion between nano-silicon and carbon nanotubes, and a dispersion simulation diagram between nano-silicon (SiPA) coated with polyaniline and carbon nanotubes.

DETAILED DESCRIPTION

Figure 3:
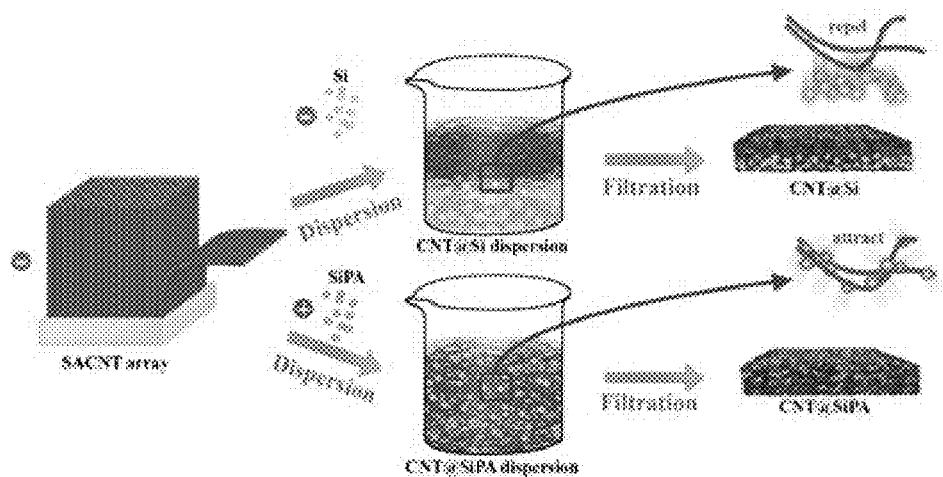
FIG. 3 is a schematic diagram of making a CNT@Si composite film and a CNT@SiPA composite film of one embodiment.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to illustrate details and features of the present disclosure better.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like. The term "binary or multi-element metal alloy" in the present disclosure means "binary metal alloy or multi-element metal alloy".

Referring to FIG. 1, one embodiment is described in relation to a method of making lithium-ion battery anode. The method comprises steps of:

step (S1): providing a nano silicon material, and coating a positively charged carbonizable polymer on a surface of the nano-silicon material, to obtain nano-silicon coated with the positively charged carbonizable polymer;

step (S2): providing a solvent and carbon nanotubes (CNTs); adding the carbon nanotubes and the nano-silicon coated with the positively charged carbonizable polymer to the solvent in a certain proportion; and then performing an ultrasonic dispersion to obtain a dispersion;

step (S3): vacuum filtering the dispersion, to obtain a composite film of CNTs and nano-silicon coated with positively charged carbonizable polymer;

step (S4): laying a carbon nanotube functional layer on each surface of two opposite surfaces of the composite film, to make the composite film sandwiched between two carbon nanotube functional layers, and the carbon nanotube functional layer comprising at least two super-aligned carbon nanotube films stacked with each other; and step (S5): high-temperature calcining the composite film with the carbon nanotube functional layer in step S4, and carbonizing the positively charged carbonizable polymer to amorphous carbon.

In step (S1), the positively charged carbonizable polymer refers to a polymer with positive surface Zeta potential and having an ability to crack into amorphous carbon when calcined at high temperatures. The positively charged carbonizable polymer can be but not limited to polyaniline, chitosan, polydopamine. In one embodiment, the positively charged carbonizable polymer is polyaniline.

In some embodiments, in the nano-silicon coated with the positively charged carbonizable polymer, a mass percentage of the nano-silicon is ranged from 40% to 50%. In one embodiment, the positively charged carbonizable polymer is polyaniline, and in nano-silicon coated with polyaniline, a mass percentage of the nano-silicon is 45.5%.

A method of coating the positively charged carbonizable polymer on the surface of the nano-silicon material can be selected according to the positively charged carbonizable polymer. In one embodiment, in-situ polyaniline coating the nano-silicon using aniline using aniline, hydrochloric acid, and ammonium persulfate in an ice-water mixed bath, to obtain the nano-silicon coated with polyaniline (SiPA).

In one embodiment, the solvent can disperse carbon nanotubes and the nano-silicon coated with positively charged carbonizable polymer. The solvent can be but not limited to ethanol, acetone, or water. In one embodiment, the solvent is ethanol.

The carbon nanotubes can be scraped into the solvent directly from a super-aligned carbon nanotube array. In one embodiment, the super-aligned carbon nanotube array is located on a substrate, and the super-aligned carbon nanotube array can be scraped off the substrate using a blade or other tool. A length of carbon nanotubes of the super-aligned carbon nanotube array is greater than or equal to 300 micrometers, a diameter of the carbon nanotubes of the super-aligned carbon nanotube array is less than or equal to 30 nanometers, and an alignment direction of the carbon nanotubes of the super-aligned carbon nanotube array is substantially the same. A surface of the carbon nanotubes of the super-aligned carbon nanotube array is pure and substantially free of impurities, such as amorphous carbon or residual catalyst metal particles, and the like.

In one embodiment, a mass loading of nano-silicon in the nano-silicon coated with the positively charged carbonizable polymer is ranged from 1 mg cm$^{-2}$ to 5 mg cm$^{-2}$; the mass loading within this range can take into account both an anode capacity and a capacity retention rate. If the mass loading is too low, the anode capacity is too small; if the mass loading is too high, a volume change of a silicon anode is significant and a problem of pulverization is serious, and the capacity retention is poor. In one embodiment, the mass loading of nano-silicon in the nano-silicon coated with the positively charged carbonizable polymer is 3 mg cm$^{-2}$.

A mass ratio of the carbon nanotubes to the nano-silicon coated with the positively charged carbonizable polymer is ranged from 1:2 to 1:4. In one embodiment, the mass ratio of the carbon nanotubes to the nano-silicon coated with the positively charged carbonizable polymer is 1:3.

In one embodiment, performing the ultrasonic dispersion using an ultrasonic cell pulverizer. In other embodiments, other ultrasonic devices can be uses to perform the ultrasonic dispersion.

A time of performing the ultrasonic dispersion can be selected according to actual needs. For example, the time of performing the ultrasonic dispersion can be affected by a size of the super-aligned carbon nanotube array and a power of ultrasonic dispersion. The ultrasonic dispersion can be stopped until the carbon nanotubes form a three-dimensional network structure in the solvent. The three-dimensional network structure is a flocculent structure. The flocculent structure is not only an intertwining of the carbon nanotubes, but also a porous fluffy structure. After the ultrasonic dispersion, the carbon nanotubes in the solvent form a continuous three-dimensional network structure, and a distribution of the carbon nanotubes in the continuous three-dimensional network structure is uniform. Since the surface of nano-silicon is coated with the positively charged carbonizable polymers, and an zeta potential of carbon nanotubes is negative, the carbon nanotubes and the positively charged carbonizable polymers are heterogeneously charged. Therefore, the carbon nanotubes can be "dispersed" with each other through electrostatic repulsion, the nano-silicon coated with positively charged carbonizable polymer can be "dispersed" with each other through electrostatic repulsion; and the carbon nanotubes and the nano-silicon coated with positively charged carbonizable polymer can be "anchored" by a mutual electrostatic attraction between them. Therefore, the nano-silicon coated with the positively charged carbonizable polymer is uniformly dispersed in the three-dimensional network structure formed by the carbon nanotubes, and the nano-silicon coated with the positively charged carbonizable polymer can be well combined with the carbon nanotubes. The continuous three-dimensional network structure can simultaneously serve as a mechanical support framework, and a transfer grid for electrons and lithium-ions.

Referring to FIG. 2, a dispersion between the nano-silicon and the carbon nanotubes scraped from SACNT arrays, and a dispersion between the nano-silicon (SiPA) coated with polyaniline and the carbon nanotubes scraped from SACNT arrays are simulated, respectively. It can be seen that from FIG. 2, before coating with polyaniline, a potential ranges from −3.9 mV (Si) to 0 mV (boundary), and Si moves away from CNT under electrostatic repulsion of 50 ns. After coating with polyaniline, a potential ranges from −1.6 mV (CNT) to 6.4 mV (SiPA), and SiPA closes to CNT under electrostatic attraction of 20 ns. The simulation results of FIG. 2 show that Si and CNTs with the same charge repel each other, and SiPA and CNTs with different charges attract each other, thereby proving an effectiveness of a "disperse-anchor" strategy.

In step (S3), the composite film of CNTs and nano-silicon coated with positively charged carbonizable polymer is a flexible self-supporting material. The three-dimensional network structure formed by the carbon nanotubes serves as a mechanical support framework, and the nano-silicon coated with positively charged carbonizable polymer is uniformly dispersed in a three-dimensional network structure.

During vacuum filtering the dispersion, a plurality of composite films of different sizes and shapes can be obtained by changing a size and a shape of a filter membrane. Since the surface of nano-silicon is coated with the positively charged carbonizable polymers, and the zeta potential of carbon nanotubes is negative, the carbon nanotubes and the positively charged carbonizable polymers are hetero-charged. Thereby, the carbon nanotubes can be "dispersed" with each other through electrostatic repulsion, the nano-silicon coated with positively charged carbonizable polymer can be "dispersed" with each other through electrostatic repulsion; and the carbon nanotubes and the nano-silicon coated with positively charged carbonizable polymer can be "anchored" by a mutual electrostatic attraction between them. Therefore, the carbon nanotubes are dispersed with each other, and the carbon nanotubes and the positively charged carbonizable polymer attract each other to form a uniform composite film.

Referring to FIG. 3, a schematic diagram of a process of making a CNT@Si composite film and a process of making a CNT@SiPA composite film. It can be seen that from FIG. 3, in the CNT@Si composite film, the nano-silicon and the carbon nanotubes are separated, not combined together, and an agglomeration between the nano-silicon is serious. However, in the CNT@SiPA composite film, the nano-silicon is well combined on surfaces of the carbon nanotubes, there is no agglomeration between the carbon nanotubes, and the dispersion is uniform.

In step (S4), the carbon nanotubes in adjacent super-aligned carbon nanotube films are crossed with each other. A cross angle of the carbon nanotubes in the adjacent super-aligned carbon nanotube films are greater than 0° and less than or equal to 90°. In one embodiment, the cross angle of the carbon nanotubes is 90°.

A method of manufacturing the carbon nanotube functional layer comprises the following steps. Drawing a first super-aligned carbon nanotube film from the super-aligned carbon nanotube array using a stretching device, and laying the first super-aligned carbon nanotube film on a substrate. And rotating the substrate by an angle, drawing a second super-aligned carbon nanotube film from the super-aligned carbon nanotube array using the stretching device, and laying the second super-aligned carbon nanotube film on a surface of the first super-aligned carbon nanotube film.

In one embodiment, the stretching device is a glass rod, and the substrate is a metal frame. In one embodiment, the substrate is rotated by 90°.

In some embodiments, the carbon nanotube functional layer comprises three or more super-aligned carbon nanotube films stacked with each other; the steps of the method of manufacturing the carbon nanotube functional layer are repeated three or more times to obtain the carbon nanotube functional layer. In one embodiment, the steps are repeated 10 times, to obtain a carbon nanotube functional layer comprises 10 layers of super-aligned carbon nanotube films stacked with each other, and the cross angle of the carbon nanotubes in the adjacent super-aligned carbon nanotube films is 90°.

Figure 4:
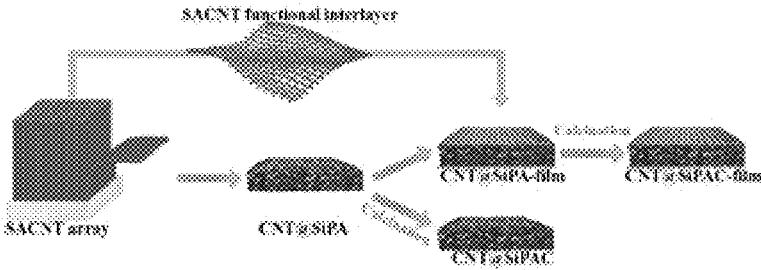
FIG. 4 is a schematic diagram of laying a carbon nanotube functional layer on two surfaces of a composite membrane of one embodiment.

In one embodiment, the carbon nanotube functional layer is first laid on the substrate, and then the carbon nanotube functional layer on the substrate is laid on the two opposite surfaces of the composite film. Referring to FIG. 4, in one embodiment, the super-aligned carbon nanotube film is drawn from the super-aligned carbon nanotube array and directly laid on the two opposite surfaces of the composite film. After a layer of super-aligned carbon nanotube film is laid on each of the two opposite surfaces of the composite film, the composite film is rotated to continue laying the super-aligned carbon nanotube film. Thereby, the super-aligned carbon nanotube films in the carbon nanotube functional layer are stacked with each other, and the carbon nanotubes in adjacent super-aligned carbon nanotube films are crossed with other.

The super-aligned carbon nanotube array comprises a plurality of carbon nanotubes, and the plurality of carbon nanotubes are substantially parallel to each other and perpendicular to the surface of the substrate. The super-aligned carbon nanotube array is substantially free of impurities, such as amorphous carbon, residual catalyst metal particles, and the like. In one embodiment, the super-aligned carbon nanotube array is made by chemical vapor deposition. A method of making the super-aligned carbon nanotube array is taught by U.S. Pat. No. 7,045,108 to Jiang et al.

The carbon nanotube film comprises a plurality of carbon nanotubes. The plurality of the carbon nanotubes in the carbon nanotube film are arranged substantially along a same direction. The plurality of carbon nanotubes that are arranged substantially parallel to a surface of the carbon nanotube film. A minority of the plurality of carbon nanotubes in the carbon nanotube film may be randomly aligned. However, the number of randomly aligned carbon nanotubes is very small and does not affect the overall oriented alignment of the majority of the plurality of carbon nanotubes in the carbon nanotube film. The majority of the plurality of carbon nanotubes in the carbon nanotube film are substantially aligned along the same direction and may not be exactly straight. They may be curved to a certain degree, or are not exactly aligned along the overall aligned direction, and can deviate from the overall aligned direction by a certain degree. Therefore, partial contact can exist between the randomly aligned carbon nanotubes and adjacent carbon nanotubes.

A number of super-aligned carbon nanotube films laid on the two opposite surfaces of the composite film can be equal or not equal. In one embodiment, the number of super-aligned carbon nanotube films laid on the two opposite surfaces of the composite film is equal.

In step (S5), the positively charged carbonizable polymer in the composite films is carbonized to amorphous carbon by high-temperature calcining, to improve a conductivity of the composite film. A temperature of high-temperature calcination is selected according to a cracking temperature of the positively charged carbonizable polymer. In one embodiment, the positively charged carbonizable polymer is polyaniline, and the composite film with the carbon nanotube functional layer is calcined at a high temperature of 900° C. for 3 hours.

In one embodiment, a mass loading of the nano-silicon in the composite film with the carbon nanotube functional layer after high temperature calcination is ranged from 1.2 mg $cm^{-2}$ to 2 mg $cm^{-2}$.

Figure 5:
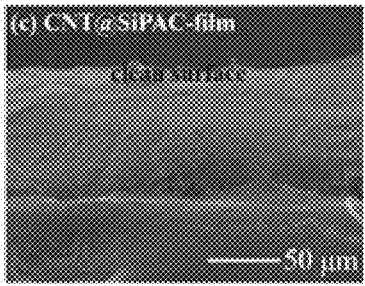
FIG. 5 is a scanning electron microscope photo of a cross section of a lithium-ion battery anode obtained by the method in FIG. 1.

Referring to FIG. 5, a scanning electron microscope photo of a cross section of a lithium-ion battery anode obtained by the method of one embodiment. It can be seen that from FIG. 5, a surface of the lithium-ion battery anode is covered with the carbon nanotube functional layer and the surface is clean, which shows that the carbon nanotube functional layer is not damaged during the high temperature calcination.

Step (S4) and step (S5) can be optional. In one embodiment, the method of making lithium-ion battery anode excludes step (S4) and step (S5). In some embodiments, the method of making lithium-ion battery anode comprises only one step of step S4 and step S5.

The following are the steps of making the lithium-ion battery anode and the performance tests of the lithium-ion battery anode in some embodiments.

Example 1

Preparation of Nano-Silicon Powder with Surface Grafted Amino Groups (Si—Nh$_2$)

Preparation of solution A: 1.5 g nano-silicon with a diameter of 20-80 nm and 250 ml ethanol are mixed and ultrasonically dispersed for 20 min. Preparation of solution B: 15 ml ammonia with a concentration of 14.5 mol/L is mixed with 75 ml deionized water. The solution B is slowly added to the solution A to form a mixture, and the mixture is stirred magnetically for 30 min. 2.375 g (3-aminopropyl) triethoxysilane (APTES) is added dropwise to the mixture and stirred for 2 h. A composite is collected by centrifugation, followed by several washes with ethanol, and a precipitate is dried overnight at 50° C. Nano-silicon powder with surface grafted amino groups (Si—NH$_2$) is obtained after collecting and grinding.

Preparation of Nano-Silicon Coated with Polyaniline (SiPA)

Preparation of solution C: 1.4 g Si—NH$_2$ and 200 ml ethanol are mixed and sonicated for 15 min, after which 0.01 mol aniline is added, and sonication is continued for 30 min. Preparation of solution D: 5.6 g ammonium persulfate is dissolved in 40 ml hydrochloric acid with a concentration of 1.4 mol/L. The solution D is slowly added to the solution C at 0° C. Magnetic stirring is maintained at 0° C. for 4 h to achieve in situ coating of PANI on the surface of Si—NH$_2$. And then a mixture is washed by centrifugation several times, and the collected precipitate is dried overnight at 50° C. and ground to obtain SiPA.

High temperature calcination to form amorphous carbon-coated nano-silicon (SiPAC).

SiPA is heated in a tube furnace under an argon atmosphere and maintained at 900° C. for 3 h to obtain nano-silicon coated with amorphous carbon (SiPAC) after a pyrolysis of PANI.

Preparation of CNT@Si, CNT@Si-film, CNT@SiPA, CNT@SiPA-film, CNT@SiPAC, and CNT@SiPAC-film, "@" refers a composite of the two substances before and after "@".

SACNT arrays are prepared by chemical vapor deposition with iron as the catalyst and acetylene as the precursor. A tube diameter of the carbon nanotubes of the SACNT arrays is 30 nm, and a height of the carbon nanotubes of the SACNT arrays is 300 μm. The clean walls and strong van der Waals forces of the SACNTs allow an extraction of continuous super-aligned CNT films from SACNT arrays by an "end-to-end" joining mechanism.

30 mg Si, 10 mg CNTs scraped from the SACNT array, and 60 ml ethanol are mixed and sonicated for 30 min, and then performing vacuum filtration to obtain the CNT@Si. 10-layer cross-stacked super-aligned SACNT films are covered on each side of the CNT@Si to obtain the CNT@Si-film, and the mass loading of Si in the CNT@Si and CNT@Si-films are both about 3 mg $cm^{-2}$.

Based on the above steps, the CNT@SiPA is obtained with 30 mg SiPA and 10 mg CNTs scraped from the SACNT array. 10-layer cross-stacked super-aligned SACNT films are covered on each side of the CNT@SiPA to obtain the CNT@SiPA-film, and the mass loading of Si in the CNT@SiPA and CNT@SiPA-films are both ranged from 1.2 mg $cm^{-2}$ to 2 mg $cm^{-2}$.

The SiPA prepared in Example 1 is defined as $SiPA_{0.01}$, the SiPAC prepared in Example 1 is defined as $SiPAC_{0.01}$, and the CNT@SiPAC prepared in Example 1 is defined as $CNT@SiPAC_{0.01}$.

Example 2

Example 2 is substantially the same as Example 1, except that $SiPA_{0.005}$ is prepared by coating different amounts of PANI on Si—NH$_2$ using 0.005 mol aniline.

$SiPA_{0.005}$ is heat treated in the same way as in Example 1 to obtain $SiPAC_{0.005}$, and $CNT@SiPA_{0.005}$ and $CNT@SiPA_{0.005}$-film are obtained by the same method as in Example 1.

Example 3

Example 3 is substantially the same as Example 1, except that $SiPA_{0.015}$ is prepared by coating different amounts of PANI on Si—NH$_2$ using 0.015 mol aniline.

$SiPA_{0.015}$ is heat treated in the same way as in Example 1 to obtain $SiPAC_{0.015}$, and $CNT@SiPA_{0.015}$ and $CNT@SiPA_{0.015}$-film are obtained by the same method as in Example 1.

Figure 6:
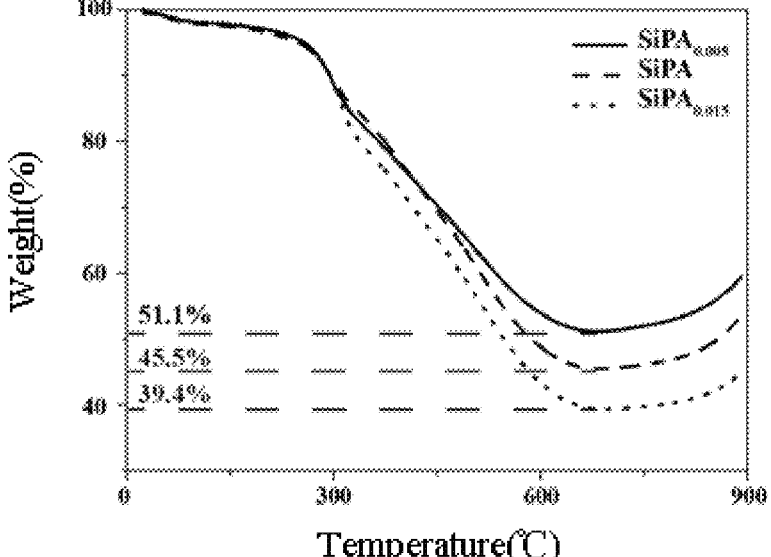
FIG. 6 is a thermogravimetric analysis (TGA) curve of $SiPA_{0.01}$, $SiPA_{0.005}$ and $SiPA_{0.015}$ of one embodiment.

Referring to FIG. 6, the mass percentages of nano-Si in $SiPA_{0.01}$, $SiPA_{0.005}$ and $SiPA_{0.015}$ in Examples 1-3 are 45.5%, 51.1% and 39.4%, respectively.

Comparative Example 1

Preparation of Si-Slurry Electrode

A homogeneous slurry is obtained by mixing nano-Si, super-P, and CMC at a weight ratio of 8:1:1 in water, and then the homogeneous slurry is coated on a copper foil collector. The copper foil collector coated with the homogeneous slurry is dried at 60° C. for 2 h and then transferred to a 120° C. oven to remove water. The Si-Slurry electrode is yielded and used for bending performance tests.

The CNT@Si, CNT@Si-film, CNT@SiPA, CNT@SiPA-film, CNT@SiPAC, CNT@SiPAC-film and Si-Slurry electrode obtained in Examples 1-3 and Comparative Example 1 are cut into discs with a diameter of 10 mm, to obtain flexible electrodes, additional adhesives and current collectors are not needed. The specific capacity is calculated based on the mass of Si.

To test the performance of the lithium-ion battery anode obtained by the method of making lithium-ion battery anode, CR2025 coin cells are assembled in an argon glove box, each of the CNT@Si, CNT@SiPA, CNT@SiPAC, CNT@Si-film, CNT@SiPA-film and CNT@SiPAC-film is as an anode, a lithium foil is as a cathode, a commercial PP film is as a separator, and 1 M LiPF6 in FEC:HFE:FEMC (2:2:6 by mass) is as an electrolyte.

Figure 7:
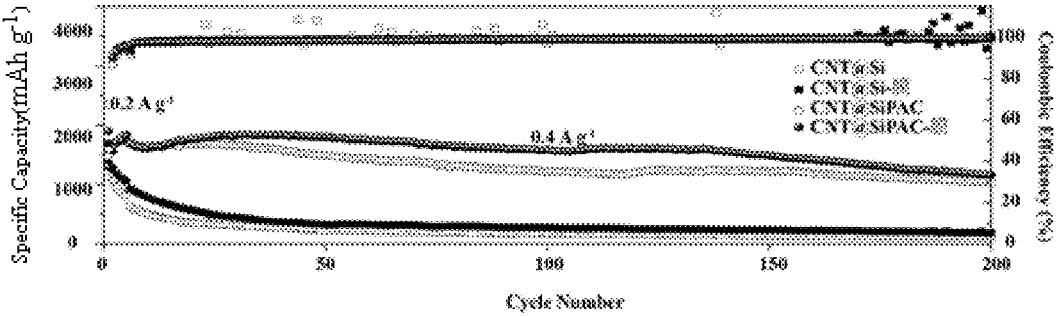
FIG. 7 is a cycle performance diagram of coin cells assembled from CNT@Si, CNT@Si-film, CNT@SiPAC, and CNT@SiPAC-film anodes of one embodiment.

Referring to FIG. 7, four coin cells are assembled using CNT@Si, CNT@Si-film, CNT@SiPAC, and CNT@SiPAC-film in Example 1 as anode, respectively. The four coin cells are first activated by cycling at a current density of 0.2 A g$^{-1}$ for 5 times, followed by cycling at a current density of 0.4 A g$^{-1}$. It can be seen that an initial specific capacity of the coin cell using CNT@Si anode is 2453.5 mAh g$^{-1}$, and the specific capacity remains only 242.2 mAh g$^{-1}$ after 50 cycles. The coin cell using CNT@Si-film anode shows slightly higher specific capacity than the coin cell using CNT@Si anode, and a loss of active material is mitigated by the SACNT films on both sides of the composite film; however, the specific capacity is only 327.9 mAh g$^{-1}$ after 50 cycles. A coulombic efficiency of each of the coin cell using CNT@Si anode and the coin cell using CNT@Si-film anode is unstable during cycling, probably because the cracked nano-Si exposed new interfaces are in contact with the electrolyte and overconsume the electrolyte. It can also be seen that the coin cell using CNT@SiPAC anode and the coin cell using CNT@SiPAC-film anode display first specific capacities of 2199.5 mAh g$^{-1}$ and 2380.4 mAh g$^{-1}$ respectively, and maintain 1046.1 mAh g$^{-1}$ and 1170.4 mAh g$^{-1}$ after 200 cycles, correspondingly. Moreover, the coulombic efficiency is stable during cycling after high temperature treatment of nano-silicon coating. These results suggest the effective inhibition of the capacity decay of Si anodes by the surface coating modification.

Figure 8:
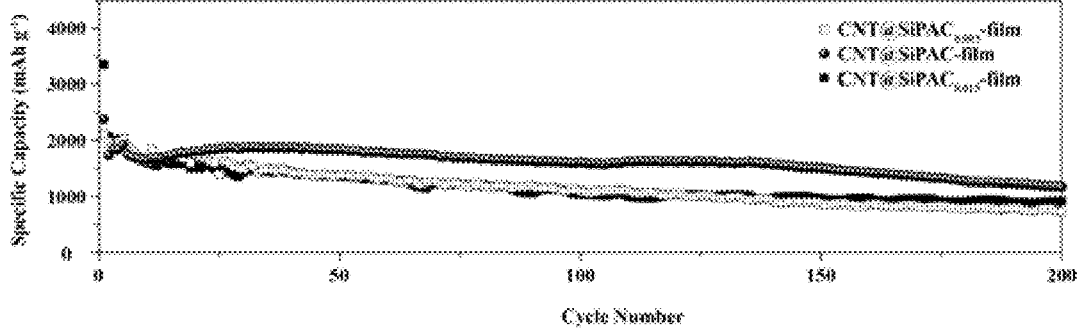
FIG. 8 is a cycle performance diagram of coin cells assembled from $CNT@SiPAC_{0.01}$-film, $CNT@SiPAC_{0.005}$-film and $CNT@SiPAC_{0.015}$-film anodes of one embodiment.

Referring to FIG. 8, the cycle performance graphs of the coin cells using the CNT@SiPAC$_{0.01}$-film, CNT@SiPAC$_{0.005}$-film and CNT@SiPAC$_{0.015}$-film as anode in Examples 1-3. It can be seen that from FIG. 8, the initial specific capacities of the coin cells using CNT@SiPAC$_{0.005}$-film anode, CNT@SiPAC$_{0.01}$-film anode and CNT@SiPAC$_{0.015}$-film anode are 2110.1 mAh g$^{-1}$, 2380.4 mAh g$^{-1}$ and 3357.5 mAh g, respectively. And after 200 cycles at 0.4 A g the specific capacities of the coin cells are 735.3 mAh g$^{-1}$, 1170.4 mAh g$^{-1}$ and 916.8 mAh g$^{-1}$, respectively. The results show that the CNT@SiPAC$_{0.01}$-film in Example 1 exhibits the best cycling performance.

Figure 9:
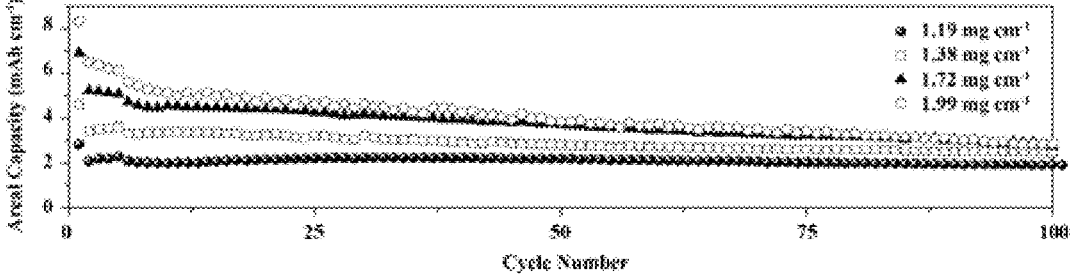
FIG. 9 is cycling capacity curves at 1.19 mg cm$^{-2}$, 1.38 mg cm$^{-2}$, 1.72 mg cm$^{-2}$ and 1.99 mg cm$^{-2}$ respectively of an areal loading of Si in the CNT@SiPAC-film anode.

Referring to FIG. 9, in the CNT@SiPAC-film anode, the cycling capacity curves at 1.19 mg cm$^{-2}$, 1.38 mg cm$^{-2}$, 1.72 mg cm$^{-2}$ and 1.99 mg cm$^{-2}$ of the areal loading of Si respectively. It can be seen that from FIG. 9, the areal capacities of a first charge-discharge cycle are 2.84 mAh cm$^{-2}$, 4.60 mAh cm$^{-2}$, 6.92 mAh cm$^{-2}$ and 8.34 mAh cm$^{-2}$ at the areal loading of Si are 1.19 mg cm$^{-2}$, 1.38 mg cm$^{-2}$, 1.72 mg cm$^{-2}$ and 1.99 mg cm$^{-2}$ respectively. And after 100 cycles at a current density of 0.4 A g$^{-1}$, the areal capacities are 1.92 mAh cm 2.45 mAh cm 2.75 mAh cm$^{-2}$ and 2.87 mAh cm$^{-2}$ at the areal loading of Si are 1.19 mg cm$^{-2}$, 1.38 mg cm$^{-2}$, 1.72 mg cm$^{-2}$ and 1.99 mg cm$^{-2}$ respectively. FIG. 9 shows that the CNT@SiPAC-film anode of the present invention has excellent cycling performance.

The test results in FIGS. 7-9 show that after the PANI is coated on the surface of the nano-silicon, the composite of the nano-silicon and the carbon nanotube is more uniform, and thus the uniformity of the anode is improved. Moreover, the carbon nanotube functional layer reduces the loss of active material and effectively improves the cycling stability of the CNT@SiPAC-film anode. Meanwhile, the high-temperature calcination increases lithium-ion diffusion coefficient D$_{Li+}$ and reduces contact resistance R$_1$ and interface charge transfer resistance R$_{ct}$. And the three-dimensional network CNT structure provides sufficient electron-conducting network and ion diffusion channels, thereby achieving fast reaction kinetics and excellent rate performance.

Figure 10:
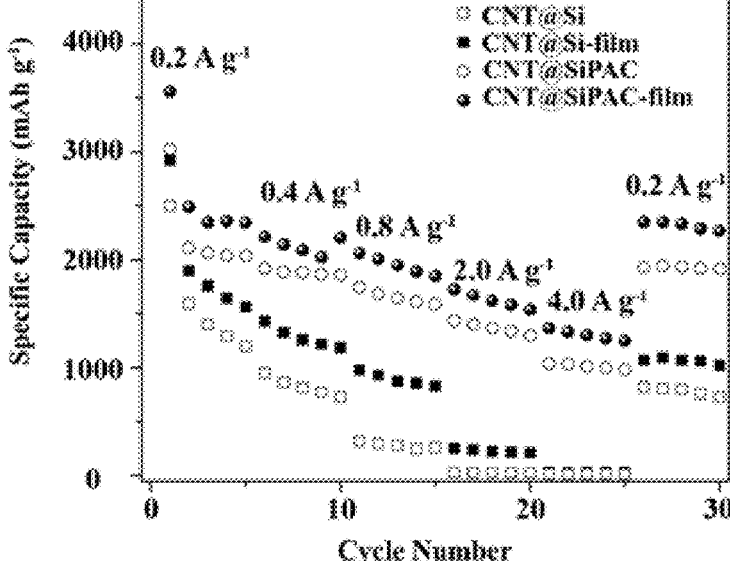
FIG. 10 are rate performance curves of batteries assembled from CNT@Si, CNT@Si-film, CNT@SiPAC, and CNT@SiPAC-film anodes of one embodiment.

Referring to FIG. 10, at current densities of 0.2 A g$^{-1}$, 0.4 A g$^{-1}$, 0.8 A g$^{-1}$, 2.0 A g$^{-1}$ and 4.0 A g$^{-1}$, the specific capacities of CNT@SiPAC-film anodes are 2344.9 mAh g$^{-1}$, 2207 mAh g$^{-1}$, 1849.4 mAh g$^{-1}$, 1539.2 mAh g$^{-1}$ and 1249.7 mAh g$^{-1}$, respectively. When the current density recovers from 4.0 A g$^{-1}$ to 0.2 A g$^{-1}$, the discharge specific capacity recovers to 2351.5 mAh g$^{-1}$. It can also be seen that the capacity of CNT@SiPAC anode is lower than the capacity of CNT@SiPAC-film anode, and the initial specific capacity of the CNT@SiPAC anode is 2039.2 mAh g$^{-1}$ at a current density of 0.2 A g$^{-1}$. When the current density recovers from 4.0 A g$^{-1}$ to 0.2 A g$^{-1}$, the specific capacity of the CNT@SiPAC anode recovers to 1933.1 mAh g$^{-1}$ with a capacity retention of 94.79%, and the capacity retention is lower than the capacity retention of the CNT@SiPAC-film anode. This indicates that the carbon nanotube functional layer of CNT@SiPAC-film anode can effectively alleviate the loss of active material. It can also be seen that the CNT@Si anode and CNT@Si-film anode exhibit poor rate performance. At a current density of 4.0 A g$^{-1}$, the specific capacities of CNT@Si anode and CNT@Si-film anode are 17.0 mAh g$^{-1}$ and 31.1 mAh g$^{-1}$, respectively. When the current density is restored to 0.2 A g$^{-1}$ the capacity retention rate of the CNT@Si anode is only 68.36%, and the capacity retention rate of the CNT@Si-film anode is only 68.54%, this result indicates that rapid alloying/dealloying significantly affects the electrochemical performance of nano-Si. FIG. 10 demonstrates that the CNT@SiPAC-film anode exhibits the best rate capability, confirming that a combination of PANI coating, carbonization and carbon nanotube functional layers enables fast reaction kinetics.

Figure 11:
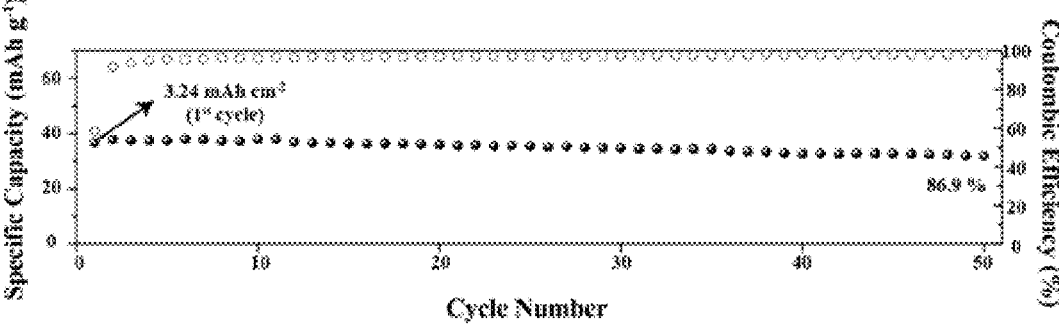
FIG. 11 is a cycle performance graph of a SiPAC/Li pouch cell assembled from CNT@SiPAC-film of one embodiment.

Referring to FIG. 11, after a first cycle at a current density of 0.4 A g$^{-1}$, a capacity of a SiPAC/Li pouch cell assembled with CNT@SiPAC-film is 36.69 mAh, and the capacity retention rate is 86.9% after 50 cycles.

Figure 12:
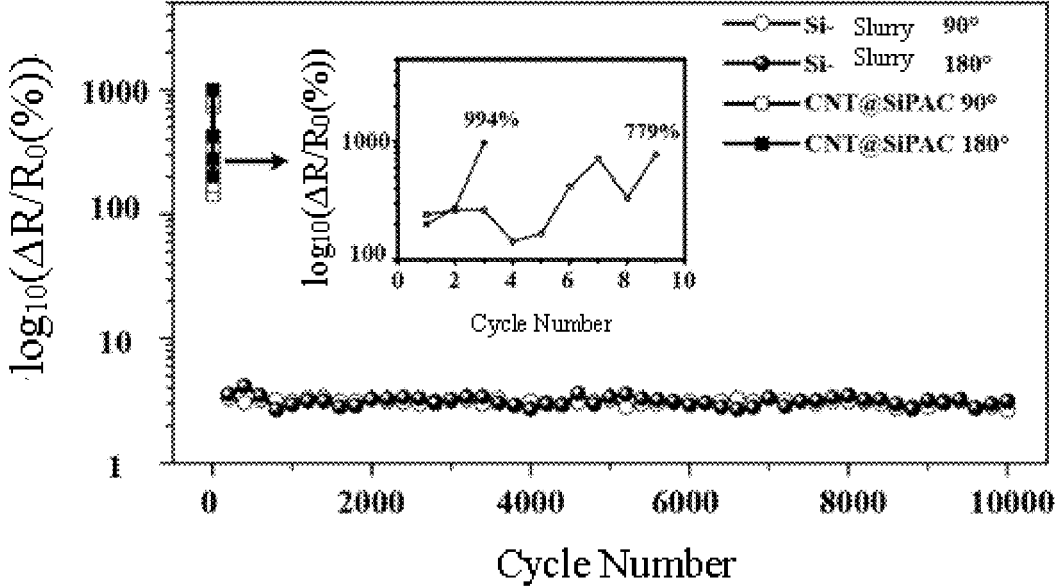
FIG. 12 are change curves of resistance with bending times for Si-slurry electrode and CNT@SiPAC-film electrode subjected to long-cycle bending at 900 and 180°.

Referring to FIG. 12, normalized resistance changes of the CNT@SiPAC-film electrode in Example 1 and the Si-slurry electrode in Comparative Example 1 measured in real-time at 90° and 180° long-cycle bending using a bending life test machine. It can be seen that a resistance of the CNT@SiPAC-film electrode fluctuates little over long periods, an incremental resistance is 2.66% after 90° bending for 10,000 times, and the incremental resistance is 3.14% after 180° bending for 10,000 times. The CNT constructs a flexible and robust mechanical skeleton, which enables the film to withstand long-cycle bending at large angles. In contrast, the Si-Slurry electrode is not resistant to bending, the resistance increased by 779% for 9 bends at 90° and by 994% for 3 bends at 180°, followed by a dramatic rise indicating a short circuit. These results illustrates the excellent flexibility and durability of the CNT@SiPAC-film electrode compared to conventional electrodes utilizing slurry and metal collectors.

Figure 13:
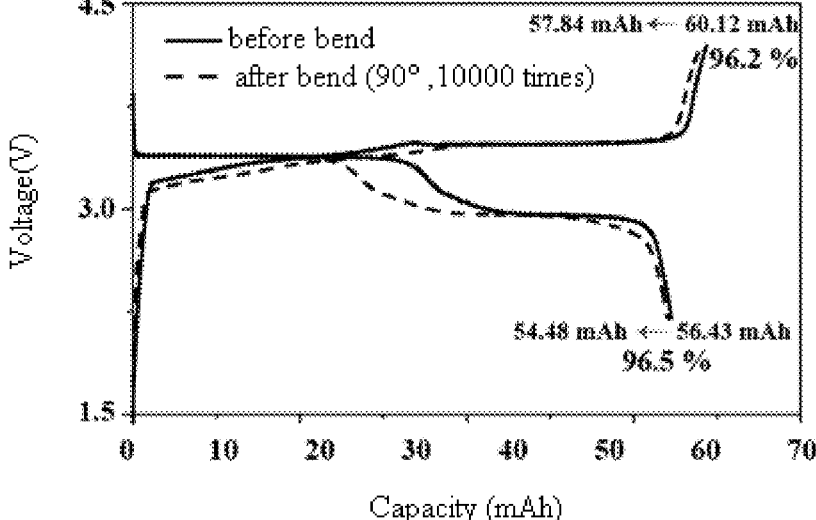
FIG. 13 are voltage curves of a SiPAC/LFP pouch battery before and after bending of one embodiment.

A SiPAC/LFP pouch cell is assembled with pre-lithiated CNT@SiPAC-film anode and CNT@LFP-film cathode to perform a bending capacity retention test. Referring to FIG. 13, the SiPAC/LFP pouch cell exhibits a charging capacity of 60.12 mAh and a discharging capacity of 56.43 mAh during a first charge/discharge. Due to the pre-lithiation, a first coulombic efficiency is 93.9%. Afterward, the SiPAC/LFP pouch cell is bent at 90° for 10,000 times, the pouch cell remains intact in appearance after bending and presents a charge capacity of 57.84 mAh and a discharge capacity of 54.48 mAh. The 96.2% charge capacity retention and 96.5% discharge capacity retention of the SiPAC/LFP pouch cell strongly demonstrates the excellent flexibility of the CNT@SiPAC-film anode.

The method of making lithium-ion battery anode is proposed from two aspects of surface modification and structure design, the positively charged carbonizable polymer is coated on nano-silicon surfaces, the anode homogeneity is improved through the "disperse-anchor" effect between positively charged carbonizable polymers and negatively charged carbon nanotubes. The severe volume change of nano-Si during cycling can be resolved by the positively charged carbonizable polymer-derived amorphous carbon, and thus the technical problems such as anode cracking and rapid capacity decay, nano-silicon aggregation, and poor conductivity and slow electrode kinetics of nano-silicon Si can also be avoided. With the carbon nanotube functional layer, the CNT@SiPAC-film anode does not require any additional binder, conductive agent and current collector, under a condition of the same specific capacity and total capacity, the lithium-ion battery obtained by the method of the present disclosure has a smaller mass than conventional lithium-ion batteries. The super-aligned carbon nanotube films provide a sufficient electron transport network, ion diffusion channels, reserved space for Si volume expansion, and robust three-dimensional mechanical support. The carbon nanotube functional layer on each surface of two opposite surfaces of the composite film can effectively reduce active material shedding from the electrode surface. The nano-Si anode obtained by the method exhibits excellent flexibility and can be bent at will.

Figure 14:
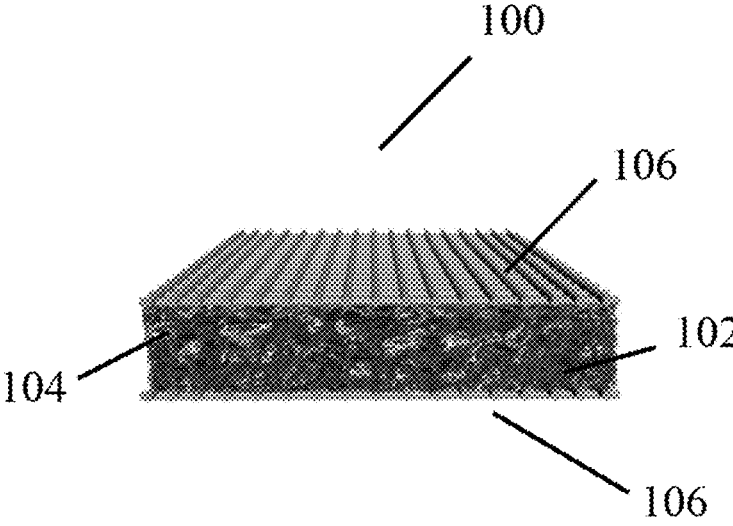
FIG. 14 is a schematic structural diagram of a lithium-ion battery anode of one embodiment.

Referring to FIG. 14, one embodiment is described in relation to a lithium-ion battery anode 100. The lithium-ion battery anode 100 comprises a carbon nanotube three-dimensional network structure 102, a plurality of nano-silicon particles 104, and two carbon nanotube functional layers 106. The plurality of nano-silicon particles 104 are coated with amorphous carbon. The plurality of nano-silicon particles 104 coated with amorphous carbon are uniformly dispersed in the carbon nanotube three-dimensional network structure 102, and adhere to surfaces of carbon nanotubes of the carbon nanotube three-dimensional network structure 102. The two carbon nanotube functional layers 106 are respectively located on two opposite surfaces of the carbon nanotube three-dimensional network structure 102, to make the carbon nanotube three-dimensional network structure 102 sandwiched between the two carbon nanotube functional layers. The lithium-ion battery anode 100 is flexible and self-supporting, and can be bent at will. The amorphous carbon is obtained by calcining a positively charged carbonizable polymer at a high temperature as the method of making lithium-ion battery anode.

The positively charged carbonizable polymer refers to a polymer that a surface of the polymer has positive Zeta potential, and the polymer can be cracked into amorphous carbon when calcined at high temperature. The positively charged carbonizable polymer can be but not limited to polyaniline, chitosan, polydopamine. In one embodiment, the positively charged carbonizable polymer is polyaniline.

In one embodiment, a size of the nano-silicon particle 104 is ranged from 20 nanometers to 80 nanometers. Of course, the size of the nano-silicon particle 104 is not limited to the size of 20 nanometers to 80 nanometers, and can be nano-silicon particles with other sizes.

In one embodiment, a mass loading of the plurality of nano-silicon particles 104 in the lithium-ion battery anode 100 is ranged from 1.2 mg cm$^{-2}$ to 2 mg cm$^{-2}$.

The carbon nanotube three-dimensional network structure 102 is a flocculent structure. The flocculent structure is not only an intertwining of the carbon nanotubes, but also a porous fluffy structure. The carbon nanotube three-dimensional network structure 102 comprises a plurality of micropores, and the plurality of micropores are conducive to a penetration of the electrolyte, thereby improving the adsorption capacity and desorption capacity of the lithium-ion battery anode 100 for lithium-ions. Further, the plurality of micropores can be used to accommodate lithium-ions, and thus a volume of the lithium-ion battery anode 100 is not significantly increased when used in a lithium-ion battery.

The carbon nanotube functional layer 106 comprises at least two super-aligned carbon nanotube films stacked with each other. The carbon nanotubes in adjacent super-aligned carbon nanotube films are crossed with each other. A cross angle of the carbon nanotubes in the adjacent super-aligned carbon nanotube films are greater than 0° and less than or equal to 90°. In one embodiment, the cross angle of the carbon nanotubes in adjacent super-aligned carbon nanotube films is 90°.

The carbon nanotube three-dimensional network structure 102, the nano-silicon particles 104 coated with amorphous carbon and the carbon nanotube functional layer 106 are the same as those described in the method of making lithium-ion battery anode, and comprises all the technical features described in the method of making lithium-ion battery anode.

Figure 15:
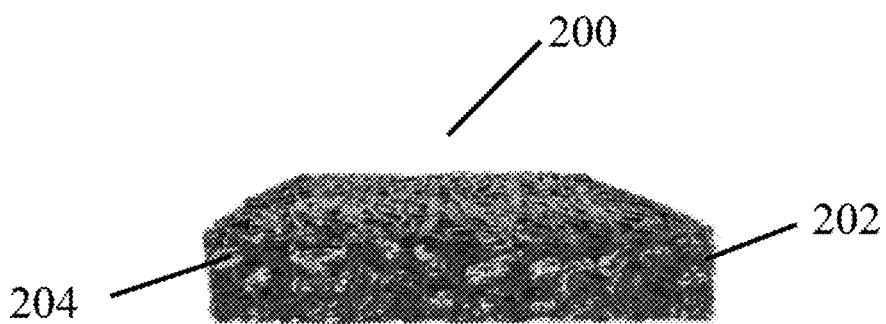
FIG. 15 is a schematic structural diagram of a lithium-ion battery anode of another embodiment.

Referring to FIG. 15, one embodiment is described in relation to a lithium-ion battery anode 200. The lithium-ion battery anode 200 comprises a carbon nanotube three-dimensional network structure 202 and a plurality of nano-silicon particles 204. The plurality of nano-silicon particles 204 are coated with positively charged carbonizable polymer. The plurality of nano-silicon particles 204 coated with positively charged carbonizable polymer are uniformly dispersed in the carbon nanotube three-dimensional network structure 202, and adhere to surfaces of carbon nanotubes of the carbon nanotube three-dimensional network structure 202.

The positively charged carbonizable polymer refers to a polymer that a surface of the polymer has positive Zeta potential, and the polymer can be cracked into amorphous carbon when calcined at high temperature. The positively charged carbonizable polymer can be but not limited to polyaniline, chitosan, polydopamine. In one embodiment, the positively charged carbonizable polymer is polyaniline.

In some embodiments, in the nano-silicon particles 204 coated with the positively charged carbonizable polymer, a mass percentage of the nano-silicon is ranged from 40% to 50%. In one embodiment, the positively charged carbonizable polymer is polyaniline, and in nano-silicon coated with polyaniline, the mass percentage of the nano-silicon is 45.5%.

In one embodiment, a mass loading of nano-silicon in the nano-silicon particles 204 coated with the positively charged carbonizable polymer is ranged from 1 mg cm$^{-2}$ to 5 mg cm$^{-2}$; the mass loading within this range can take into account both an anode capacity and a capacity retention rate. If the mass loading is too low, the anode capacity is too small; if the mass loading is too high, a volume change of the silicon anode is significant and a problem of pulverization is serious, and the capacity retention is poor. In one embodiment, the mass loading of nano-silicon in the nano-silicon particles 204 coated with the positively charged carbonizable polymer is 3 mg cm$^{-2}$.

A mass ratio of the carbon nanotube three-dimensional network structure 202 to the nano-silicon particles 204 coated with the positively charged carbonizable polymer is ranged from 1:2 to 1:4. In one embodiment, the mass ratio of the carbon nanotube three-dimensional network structure 202 to the nano-silicon particles 204 coated with the positively charged carbonizable polymer is 1:3.

In one embodiment, a size of the nano-silicon particle 204 is ranged from 20 nanometers to 80 nanometers. Of course, the size of the nano-silicon particle 204 is not limited to the size of 20 nanometers to 80 nanometers, and can be nano-silicon particles with other sizes.

The carbon nanotube three-dimensional network structure 202 is a flocculent structure. The flocculent structure is not only an intertwining of the carbon nanotubes, but also a porous fluffy structure. The carbon nanotube three-dimensional network structure 202 comprises a plurality of micropores, and the plurality of micropores are conducive to a penetration of the electrolyte, thereby improving the adsorption capacity and desorption capacity of the lithium-ion battery anode 200 for lithium-ions. Further, the plurality of micropores can be used to accommodate lithium-ions, and thus a volume of the lithium-ion battery anode 200 is not significantly increased when used in a lithium-ion battery.

The lithium-ion battery anode 200 is flexible and self-supporting, and can be bent at will.

In one embodiment, the lithium-ion battery anode 200 further comprises two carbon nanotube functional layers (no shown), and the two carbon nanotube functional layers are located on two opposite surfaces of the carbon nanotube three-dimensional network structure 202 respectively, to make the carbon nanotube three-dimensional network structure 202 sandwiched between the two carbon nanotube functional layers. The carbon nanotube functional layer comprises at least two super-aligned carbon nanotube films stacked with each other; and the carbon nanotube functional layer comprises at least two super-aligned carbon nanotube films stacked with each other. The carbon nanotubes in adjacent super-aligned carbon nanotube films are crossed with each other. In one embodiment, the carbon nanotube functional layer comprises at least two super-aligned carbon nanotube films stacked with each other, and the cross angle of the carbon nanotubes in adjacent super-aligned carbon nanotube films is 90°.

The carbon nanotube three-dimensional network structure 202, the nano-silicon particles 204 coated with the positively charged carbonizable polymer and the carbon nanotube functional layer are the same as those described in the method of making lithium-ion battery anode, and comprises all the technical features described in the method of making lithium-ion battery anode.

The lithium-ion battery anode obtained by the method of making the lithium-ion battery anode has high uniformity. The severe volume change of nano-Si during cycling can be resolved by the positively charged carbonizable polymer-derived amorphous carbon, and thus the technical problems such as anode cracking and rapid capacity decay, nano-silicon aggregation, and poor conductivity and slow electrode kinetics of nano-silicon Si can also be avoided. With the carbon nanotube functional layer, the CNT@SiPAC-film anode does not require any additional binder, conductive agent and current collector, under a condition of the same specific capacity and total capacity, the lithium-ion battery obtained by the method of the present disclosure has a smaller mass than conventional lithium-ion batteries. The super-aligned carbon nanotube films provide a sufficient electron transport network, ion diffusion channels, reserved space for Si volume expansion, and robust three-dimensional mechanical support. The carbon nanotube functional layer on each surface of two opposite surfaces of the composite film can effectively reduce active material shedding from the electrode surface. The nano-Si anode obtained by the method exhibits excellent flexibility and can be bent at will. The carbon nanotube three-dimensional network structure comprises a plurality of micropores, and the plurality of micropores are conducive to a penetration of the electrolyte, thereby improving the adsorption capacity and desorption capacity of the lithium-ion battery anode for lithium-ions. Further, the plurality of micropores can be used to accommodate lithium-ions, and thus a volume of the lithium-ion battery anode is not significantly increased when used in a lithium-ion battery.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A lithium-ion battery anode, comprising:
a carbon nanotube three-dimensional network structure, comprising a plurality of carbon nanotubes intertwined with each other, the carbon nanotube three-dimensional network structure defining two opposite surfaces of the carbon nanotube three-dimensional network structure as a first surface and a second surface;
a plurality of nano-silicon particles, coated with amorphous carbon, dispersed in the carbon nanotube three-dimensional network structure, and adhered to surfaces of the plurality of carbon nanotubes, wherein the amorphous carbon is obtained by calcining positively charged carbonizable polymers; and
a carbon nanotube functional layer located on each of the first surface and the second surface, such that the carbon nanotube three-dimensional network structure is sandwiched between two carbon nanotube functional layers, wherein the carbon nanotube functional layer comprises at least two super-aligned carbon nanotube films stacked on top of each other, and carbon nanotubes in adjacent super-aligned carbon nanotube films are crossed with each other.

2. The lithium-ion battery anode of claim 1, wherein a cross angle of carbon nanotubes in adjacent super-aligned carbon nanotube films of the at least two super-aligned carbon nanotube films is 90°.

3. The lithium-ion battery anode of claim 1, wherein sizes of the plurality of nano-silicon particles range from 20 nanometers to 80 nanometers.

4. The lithium-ion battery anode of claim 1, wherein mass loadings of the plurality of nano-silicon particles in the lithium-ion battery anode range from 1.2 mg cm$^{-2}$ to 2 mg cm$^{-2}$.

5. The lithium-ion battery anode of claim 1, wherein the positively charged carbonizable polymer comprises polyaniline, chitosan, or polydopamine.

6. The lithium-ion battery anode of claim 1, wherein the plurality of carbon nanotubes are intertwined with each other such that a plurality of micropores are distributed between the plurality of carbon nanotubes.

7. A lithium-ion battery anode, comprising:
  a carbon nanotube three-dimensional network structure, formed by a plurality of carbon nanotubes intertwined with each other; and
  a plurality of nano-silicon particles, coated with positively charged carbonizable polymers, dispersed in the carbon nanotube three-dimensional network structure, and adhered to surfaces of the plurality of carbon nanotubes.

8. The lithium-ion battery anode of claim 7, wherein two opposite surfaces of the carbon nanotube three-dimensional network structure are defined as a first surface and a second surface, the lithium-ion battery anode further comprises a first carbon nanotube functional layer and a second carbon nanotube functional layer, the first carbon nanotube functional layer is located on the first surface, and the second carbon nanotube functional layer is located on the second surface, each of the first carbon nanotube functional layer and the second carbon nanotube functional layer comprises at least two super-aligned carbon nanotube films stacked on top of each other, and carbon nanotubes in adjacent super-aligned carbon nanotube films are crossed with each other.

9. The lithium-ion battery anode of claim 8, wherein a cross angle of carbon nanotubes in adjacent super-aligned carbon nanotube films of the at least two super-aligned carbon nanotube films is 90°.

10. The lithium-ion battery anode of claim 7, wherein the positively charged carbonizable polymer comprises polyaniline, chitosan, or polydopamine.

11. The lithium-ion battery anode of claim 7, wherein in the nano-silicon particles coated with the positively charged carbonizable polymer, a mass percentage of the nano-silicon particles is ranged from 40% to 50%.

12. The lithium-ion battery anode of claim 7, wherein mass loadings of the nano-silicon particles in the nano-silicon particles coated with the positively charged carbonizable polymer range from 1 mg cm$^{-2}$ to 5 mg cm$^{-2}$.

13. The lithium-ion battery anode of claim 7, wherein sizes of the plurality of nano-silicon particles range from 20 nanometers to 80 nanometers.

14. The lithium-ion battery anode of claim 7, wherein a mass ratio of the carbon nanotube three-dimensional network structure to the nano-silicon particles coated with the positively charged carbonizable polymer is ranged from 1:2 to 1:4.

15. The lithium-ion battery anode of claim 7, wherein the plurality of carbon nanotubes are intertwined with each other such that a plurality of micropores are distributed between the plurality of carbon nanotubes.

\* \* \* \* \*